Sept. 28, 1971     O. R. BUTSCH     3,608,201
RIGHT ANGLE MICROMETER
Filed March 19, 1969
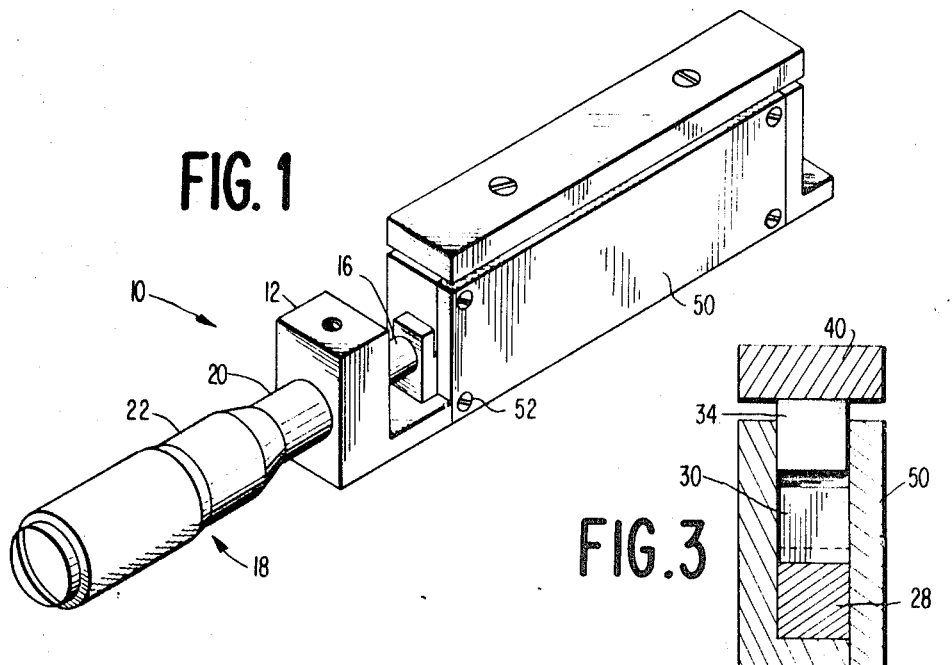
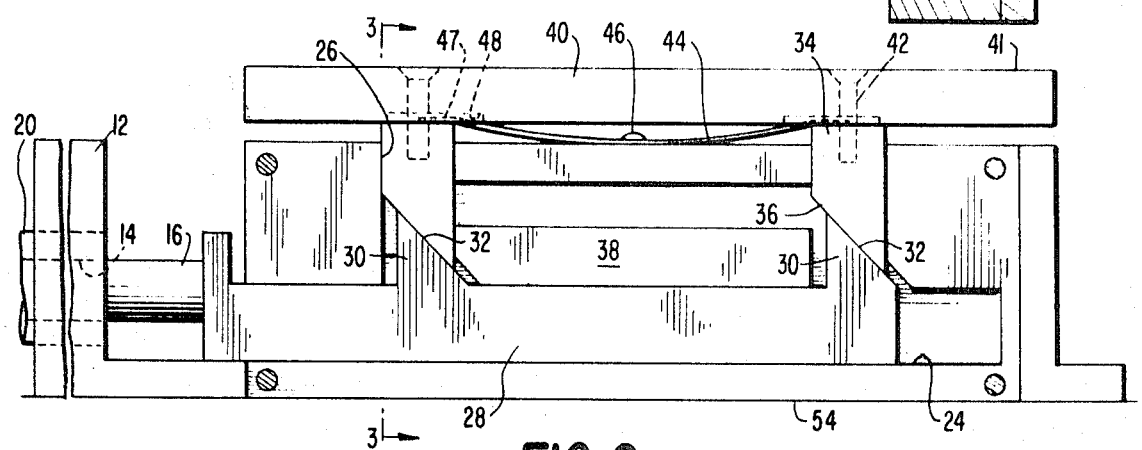
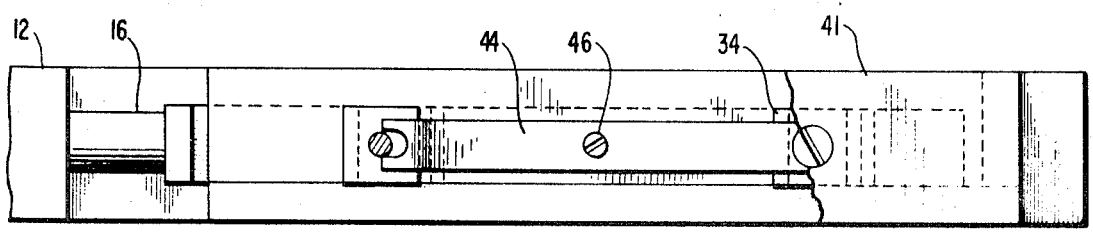
INVENTOR
OTTO R. BUTSCH
BY *Le Blanc & Shur*
ATTORNEYS

United States Patent Office 3,608,201
Patented Sept. 28, 1971

3,608,201
RIGHT ANGLE MICROMETER
Otto R. Butsch, New Albany, Ohio, assignor to Reliance Electric Company, Columbus, Ohio
Filed Mar. 19, 1969, Ser. No. 808,395
Int. Cl. G01b 5/14
U.S. Cl. 33—162                    7 Claims

ABSTRACT OF THE DISCLOSURE

Disclosed is a micrometer spindle and a bar mounted for reciprocating movement on a frame. A pair of blocks are carried by the frame for movement in a direction at right angles to the direction of movement of the spindle and bar. Cam surfaces on the blocks and bar engage one another whereby movement of the bar in one direction by threading action of the micrometer spindle moves the blocks outwardly at right angles to the spindle. A spring biases the blocks for inward movement in following engagement with the cam surfaces carried by the bar. A measuring plate connects between the blocks and indicia carried by the micrometer spindle and thimble measure the displacement of the plate at right angles to the axis of the spindle.

---

The present invention relates to a measuring instrument and particularly relates to a micrometer for measuring distances at right angles to the micrometer spindle.

Conventional micrometers usually employ an accurately machined screw or spindle which is threadedly received in a barrel or frame. The spindle is threaded by a thimble or ratchet knob carried about the barrel, the latter carrying a scale. The frame usually carries an anvil spaced axially from the end of the spindle. When a measurement is to be taken, the object to be measured is located between the end of the spindle and the anvil. The spindle is then displaced axially by threading action such that the anvil and spindle end engage on opposite sides of the object. The displacement of the thimble along the sleeve of the micrometer provides a measurement of the object with an additional scale on the thimble providing a fine measurement. In most conventional micrometers, the distance measured extends parallel to the axis of the spindle.

Variations of the foregoing described micrometer have been proposed. One such variation is employed to measure heights and includes a triangular frame with the spindle of the micrometer extending along the hypotenuse of the frame. Threadedly mounted on the spindle is a measuring block or rider which moves along the hypotenuse of the frame by threading action of the spindle. The rider carries a pointer which indicates on a scale carried on the hypotenuse of the frame the height of the measuring surface carried by the rider above the base of the frame. The measurement is provided by engaging the base of the triangular frame and the measuring surface of the rider within the object to be measured. Particularly, the spindle is rotated by a micrometer disk threaded on the spindle to displace the rider along the spindle until the measuring surface on the rider engages one of the surfaces of the object. A reading is taken on the hypotenuse scale and the scale on the micrometer disk. This type of micrometer height gage is somewhat unwieldly and cannot be employed in certain measuring applications. Moreover, it is often difficult to read the micrometer scale in view of its orientation relative to the part being measured.

To my knowledge, conventional micrometers are most often employed to measure distances extending parallel to the axis of rotation of the micrometer spindle. Typical of these are the machinist's outside and inside micrometer calipers, micrometer depth gages, and small hole gages. None, except the foregoing particularly described height gage provide for measurements of distances in directions other than parallel to the axis of the micrometer spindle. As noted previously, however, the triangularly mounted micrometers are difficult to utilize, relatively cumbersome, and can only be used for measuring distances on parts having significant depths, i.e., parts adapted to receive the hypotenuse and leg portions of the frame.

The present invention provides a novel micrometer for measuring distances which extend at right angles to the spindle of the micrometer. To accomplish the foregoing, there is provided a frame carrying a micrometer spindle and a bar movable by the spindle in a like axial direction. The bar carries a pair of spaced cam surfaces. A pair of measuring blocks are slidably mounted in the frame for reciprocating movement at right angles to the direction of movement of the bar. The blocks carry a pair of cam surfaces engageable with the cam surfaces on the bar such that inward movement of the bar displaces the measuring blocks outwardly of the frame. A leaf spring engageable between the frame and the measuring blocks biases the latter inwardly into following engagement with the cam surfaces on the bar. The leaf spring also biases the bar through the cooperating cam surfaces of the bar and blocks into following engagement with the inner end of the micrometer spindle. The micrometer spindle is threaded within a micrometer barrel and carries a thimble whereby the displacement of the measuring blocks in a direction at right angles to the axis of the spindle can be measured on barrel and thimble carried scales.

Accordingly, it is a primary object of the present invention to provide a novel and improved micrometer for measuring distances extending angularly from its spindle axis.

It is another object of the present invention to provide a novel micrometer for measuring distances extending substantially at right angles to the axis of the micrometer spindle.

It is a further object of the present invention to provide a micrometer having the foregoing characteristics and which is simple in construction, easy to operate, economical to manufacture, and accurate in measurement.

These and further objects and advantages of the present invention will become more apparent upon reference to the following specification, claims, and appended drawings, wherein:

FIG. 1 is a perspective view of a right angle micrometer constructed in accordance with the present invention;

FIG. 2 is an enlarged fragmentary side elevational view thereof with the side closure plate removed;

FIG. 3 is an enlarged cross sectional view thereof taken about on line 3—3 of FIG. 2; and FIG. 4 is an enlarged fragmentary plan view of the right angle micrometer hereof with portions broken away for clarity of illustration.

Referring now to FIG. 1, there is illustrated a frame, generally indicated at 10, having an upstanding end portion 12 suitably bored as at 14 (FIG. 2) to slidably receive the spindle 16 of a micrometer barrel, generally indicated at 18. The barrel of the micrometer includes a sleeve 20 fixed to the frame portion 12, sleeve 20 receiving the spindle 16. The spindle 16 is screw threaded within the micrometer barrel in the conventional manner and a thimble 22 is carried by the outer end of the spindle 16 for rotating the latter. It will be appreciated that any conventional micrometer barrel construction may be employed and that the barrel 18 is in all respects conventional except as it attaches to the frame 10 with the spindle 16 extending through frame portion 12. Accordingly, the axial displacement of spindle 16 can be measured on scales provided on sleeve 20 and thimble 22 in the conventional manner. A vernier scale may also be provided on sleeve 20 to increase the accuracy of the micrometer.

Frame 10 comprises a block or casting, preferably metal, formed to provide a channel 24 extending longitudinally along the block and opening through a side face thereof. The block is further formed to provide a pair of longitudinally spaced, vertically extending grooves 26 opening through the top face thereof and into channel 24. Received within the channel 24 is a bar 28 having a pair of longitudinally spaced upwardly projecting lugs 30. Identical planar cam surfaces 32 are provided on the upper faces of lugs 30. A pair of measuring blocks 34 are received in the grooves 26 and carry identical planar cam surfaces 36 on their lower ends. The cam surfaces 36 on blocks 34 engage the cam surfaces 32 on lugs 30 of bar 28. As disclosed, blocks 34 are mounted for sliding movement in frame 10 in a direction at right angles to the direction of sliding movement of bar 28 and it will be appreciated that movement of bar 28, for example to the right as seen in FIG. 2, cams blocks 34 upwardly through the interaction of cam surfaces 32 and 36. A guide bar 38 extends between the inner faces of blocks 34 and forms a portion of the grooves 26. Guide bar 38 also overlies the upper face of bar 28. Accordingly, guide bar 38 constrains blocks 34 and bar 28 for sliding movement at right angles one to the other.

A measuring plate 40 having an upper measuring surface 41 is connected to the blocks 34 as by screws 42 and it will be seen that longitudinal displacement of bar 28, for example to the right in FIG. 2, displaces the measuring plate 40 in a direction at right angles thereto. To maintain blocks 34 within frame 10 and to maintain bar 28 in engagement against the inner end of micrometer spindle 16, a leaf spring 44 is connected intermediate its ends as by a screw 46. The opposite ends 47 of spring 44 overlie blocks 34. Suitable recesses 48 are provided along the underface of measuring plate 40 to receive the ends of leaf spring 44 between blocks 34 and plate 40. Spring 44 biases blocks 34 inwardly and retains the cam surfaces 36 on blocks 34 in following engagement with the cam surfaces 32 of bar 28. This inward bias of blocks 34 also biases bar 28 into following engagement with the inner end of micrometer spindle 16. Specifically, spring 44 biases bar 28 for movement from right to left as seen in FIG. 2. A side closure plate 50 is connected to frame 10 as by screws 52 to suitably enclose the foregoing described bar and block assembly.

In use, the right angle micrometer is employed to measure distances extending at right angles to the axis of the micrometer spindle 16. Particularly, the measuring surfaces comprising the upper face 41 of measuring plate 40 and the underface 54 of frame 10 are inserted between the parts to be measured. The micrometer thimble 22 is then rotated to drive the spindle 16 axially, for example from left to right as seen in FIG. 2, to drive bar 28 longitudinally from left to right. The longitudinal displacement of bar 28 drives blocks 34 outwardly of frame 10 against the bias of leaf spring 44 through the interaction of the cam surfaces 32 and 36. The micrometer thimble 22 is threaded until measuring surface 41 engages one of the surfaces of the part being measured and suitable gaging force is obtained. The displacement of the measuring plate relative to its initial reference position can then be read on the appropriate scales on sleeve 20 and thimble 22.

After measurement, the thimble 22 can be rotated to displace the spindle 16 back to its initial position, i.e., from right to left as seen in FIG. 2. Spring 44 biases the measuring blocks 34 inwardly and cam surfaces 32 on bar 38 follow the inward movement of blocks 34 to drive bar 28 into following engagement with the inner end of spindle 16. In this manner, measuring plate 40 follows the movement of the micrometer thimble 22 and spindle 16 in both axial directions.

What is claimed and desired to be secured by United States Letters Patent is:

1. A measuring instrument comprising a frame having a planar measuring surface on one side thereof, a spindle threadedly carried by said frame, a member carried by said frame for reciprocating movement in a direction substantially parallel to the axis of said spindle, means cooperable between said spindle and said member for moving said member in one longitudinal direction in response to movement of said spindle in a like direction, a pair of discrete blocks spaced one from the other in a direction substantially parallel to the axis of the spindle and carried by said frame for reciprocating movement adjacent the other side of said frame in directions substantially normal to the direction of movement of said member and said spindle, means cooperating between said blocks and said member for moving said blocks concurrently in one of said normal directions in response to movement of said spindle and said member in said one longitudinal direction, a measuring plate connecting said blocks one to the other and having a planar measuring surface extending in a plane parallel to the plane containing said first mentioned planar surface, and means carried by said spindle for indicating the displacement of the measuring surface carried by said plate from a reference position.

2. An instrument according to claim 1 including a sleeve, said spindle being received through said sleeve and a micrometer thimble carried by said spindle and about said sleeve, said indicating means being carried by said sleeve and said thimble.

3. An instrument according to claim 1 wherein said member is separate from said spindle, and means biasing said member into following engagement with said spindle.

4. An instrument according to claim 1 including means biasing said measuring blocks into following engagement with said member.

5. An instrument according to claim 1 including means biasing said blocks for movement in the opposite normal direction in response to movement of said spindle and member in the opposite longitudinal direction.

6. An instrument according to claim 5 wherein said latter moving means includes a pair of cam surfaces carried by said member and a pair of cam followers carried by said blocks engageable with said cam surfaces, said biasing means biasing said blocks into following engagement with said cam surfaces.

7. An instrument according to claim 6 wherein said biasing means includes a leaf spring fixed to said frame between said blocks, the opposite ends of said spring engaging said blocks to bias the latter in the opposite normal direction.

References Cited
UNITED STATES PATENTS

| | | | |
|---|---|---|---|
| 846,607 | 3/1907 | Peddycoart | 33—167X |
| 1,363,250 | 12/1920 | Hanson | 33—162 |
| 1,655,133 | 1/1928 | Clase | 33—162X |
| 2,135,912 | 11/1938 | Rae | 33—164 |
| 3,247,598 | 4/1966 | Wilkes | 33—162 |

LEONARD FORMAN, Primary Examiner

G. G. KUEHL, Assistant Examiner

U.S. Cl. X.R.

33—164C